United States Patent [19]

Schulz et al.

[11] Patent Number: 4,920,157

[45] Date of Patent: Apr. 24, 1990

[54] RADIATION-CURABLE CONTACT ADHESIVES BASED ON POLYURETHANE ACRYLATES

[75] Inventors: Güenther Schulz, Ludwigshafen; Wolfgang Druschke, Dirmstein; Helmut Jaeger, Bobenheim, all of Fed. Rep. of Germany

[73] Assignee: BASF Aktiengesellschaft, Ludwigshafen, Fed. Rep. of Germany

[21] Appl. No.: 168,464

[22] Filed: Mar. 15, 1988

[30] Foreign Application Priority Data

Mar. 26, 1987 [DE] Fed. Rep. of Germany ....... 3709920

[51] Int. Cl.$^5$ .......................... C08F 20/34; C08F 20/56
[52] U.S. Cl. ...................................... 522/96; 525/440; 525/920; 528/75; 522/97; 526/301
[58] Field of Search ............................ 525/440; 522/96

[56] References Cited

U.S. PATENT DOCUMENTS

| | | | |
|---|---|---|---|
| 4,153,776 | 5/1979 | Friedlander et al. ................ | 528/75 |
| 4,153,778 | 5/1979 | Park et al. ............................ | 528/75 |
| 4,239,866 | 12/1980 | Reitel et al. ........................ | 525/440 |
| 4,305,854 | 12/1981 | Rowe .................................. | 525/440 |
| 4,467,078 | 8/1984 | Kolycheck et al. .................. | 522/96 |
| 4,694,052 | 9/1987 | Hirose et al. ........................ | 522/96 |

FOREIGN PATENT DOCUMENTS 0088300 9/1983 European Pat. Off. .
2357486 8/1984 Fed. Rep. of Germany .

*Primary Examiner*—John C. Bleutge
*Assistant Examiner*—Susan Berman
*Attorney, Agent, or Firm*—Oblon, Spivak, McClelland, Maier & Neustadt

[57] ABSTRACT

Radiation-curable contact adhesives containing (A) oligomeric or polymeric reaction products of (a) diisocyanates, (b) polyesterols and/or polyetherols, (c) optionally $C_2$–$C_{50}$-diols, (d) $C_2$–$C_{20}$-hydroxyalkyl (meth-)acrylates and (e) monohydroxyalkylcarboxylic acids in defined weight proportions and (e) monovinyl compounds in an amount of 2–90% by weight, based on A+B, produce contact adhesive layers of particularly high surface tackiness and particularly high cohesion.

12 Claims, No Drawings

RADIATION-CURABLE CONTACT ADHESIVES BASED ON POLYURETHANE ACRYLATES

The present invention relates to radiation-curable contact adhesives which contain specific polyurethane acrylates and monovinyl compounds.

Contact adhesive compositions are increasingly used for producing labels, adhesive tapes, decorative foils and similar self-adherent sheetlike structures. The contact adhesives used for this purpose must have certain properties:

Besides good surface tackiness the coating should have very high cohesion. The contact adhesive should in addition be highly resistant to light, air and moisture, and the tackiness should be constant over a very wide temperature range. In addition, there is increasing interest in solvent-free contact adhesives, avoiding expensive removal equipment for the solvent.

DE-A-2,357,486, for example, discloses a process for producing contact adhesive coatings where a mixture which is liquid at room temperature and composed of a mono-olefinically unsaturated compound which forms tacky polymers, a doubly olefinically unsaturated compound and a polymeric substance having a softening point below 50° C. and an average molecular weight from 500 to 10,000 is treated with ionized beams. The monoolefinically unsaturated compounds used in this mixture may be acrylic and methacrylic esters of, usually, from 4 to 12 carbon atom alkanols, and the adhesive layers obtained have a high shear strength at room temperature and good surface tackiness. However, the disadvantage is that such adhesive layers are prone to strong cold flow and lack of shear strength at elevated temperatures.

In the process of European Patent 0,088,300, self-adherent coatings are obtained by irradiating mixtures of derivatives of dihydroxypropyl acrylates, for example a Versatic monoester of 2,3-dihydroxyprop-1-yl acrylate with polymers having a glass transition temperature below 0° C. and a K value from 20 to 80 and/or a tackifying resin which have improved shear strength at elevated temperatures. However, here the disadvantage is the relatively low peel strength or tackiness which, by the addition of resins, can only be increased at the expense of the shear strength.

Finally, U.S. Pat. No. 4,305,854 discloses using mixtures of a reaction product of 1 equivalent of an isocyanato-containing intermediate from about 1 equivalent of a monomeric compound containing a plurality of active hydrogen atoms with 2 equivalents of an organic polyisocyanate and 1 equivalent of a monomeric olefinically unsaturated compound containing one active hydrogen atom in mixture with a tackifier, a polymerization inhibitor and with or without a photoinitiator and also with or without mono-unsaturated or polyunsaturated diluents to obtain, by irradiation with ultraviolet light or electron beams in the absence of any solvents, contact adhesive layers which have good shear strengths even at elevated temperature. However, the surface tackiness and cohesion of such contact adhesive layers still leaves something to be desired.

We have found that a radiation-curable contact adhesive containing

A. an oligomeric or polymeric reaction product having a molecular weight from 500 to 100,000 of
  (a) a diisocyanate,
  (b) from 20 to 99 equivalent %, based on component (a), of a polyesterol and/or polyetherol,
  (c) from 0 to 60 equivalent %, based on component (a), of a diol of 2 to 50 carbon atoms,
  (d) a hydroxyalkyl (meth)acrylate of 2 to 20 carbon atoms in the alkyl and
  (e) a monohydroxyalkylcarboxylic acid,
where the total of the quantities of components (b), (c), (d) and (e) is equivalent in terms of OH groups to the quantity of component (a), the quantity of components (d) and (e) together accounts for from 1 to 50 equivalent %, based on component (a), and the equivalent ratio of component (d):(e) is from 1:9 to 9:1, and B. from 2 to 90% by weight, based on the total amount of components A and B, of a monovinyl compound, produces on irradiation with high-energy rays a contact adhesive layer of particularly high surface tackiness and particularly high cohesion. This is surprising since it was known from U.S. Pat. No. 4,153,778 that coatings of reaction products of polyoxytetramethylenediols or polycaprolactone polyols, diisocyanates and di- or trimethylolcarboxylic acids and also hydroxyalkyl acrylates produce on irradiation, for example with ultraviolet light, non-tacky surfaces.

The reaction product A preferably has a molecular weight from 1,000 to 30,000, and preferably is used in an amount from 40 to 70% by weight, based on the total amount of components A and B. The molecular weights specified here are calculated on the basis of the quantity of monohydroxy compounds used.

To prepare reaction product A, the diisocyanate (a) is preferably an aliphatic isocyanate, such as isophorone isocyanate and/or hexamethylene diisocyanate. Also suitable are 2,4- or 2,6-toluylene diisocyanate, 4,4'-diisocyanatodiphenylmethane and 4,4'-diisocyanatodicyclohexylmethane.

In addition to the diisocyanate it is also possible to use, in an amount from 0 to 5 equivalent %, based on total isocyanate (a), a triisocyanate, for example a trimerization product of hexamethylene diisocyanate or a trimerization product of toluylene diisocyanate.

Component (b) for preparing the reaction product A is preferably used in a proportion from 50 to 98 equivalent %, based on component (a), and can comprise the polyethers customary for the preparation of polyurethanes, such as polytetramethylene oxide, polypropylene oxide or polyethylene oxide, and also copolymers of ethylene oxide and propylene oxide, and also the polyesterols customary for the preparation of polyurethanes, obtained for example from adipic acid and mixtures of various alkanediols, such as ethylene glycol, 1,3-propanediol, 1,4-butanediol, 1,5-pentanediol, 1,6-hexanediol and/or neopentylglycol. Such polyetherols and polyesterols usually have molecular weights from 200 to 20,000, in particular from 500 to 10,000.

Suitable alkanediols (c) have from 2 to 50, in particular from 2 to 20, carbon atoms and are used in amounts from 0 to 60 equivalent %, preferably from 0 to 40 equivalent %, based on component (a), specific examples being in particular 1,4-butanediol and 1,6-hexandiol and also 1,3-propanediol, ethylene glycol, 1,8-octanediol and 1,10-decanediol.

Suitable hydroxyalkyl (meth)acrylates (d) of 2 to 20 carbon atoms in the alkyl are in particular betahydroxyethyl acrylate and methacrylate and also 4-hydroxybutyl acrylate and methacrylate, furthermore 2-hydroxypropyl acrylate and methacrylate and also in particular the Versatic monoester of 2,3-dihydroxyprop-1-yl acrylate.

Component (e) in the preparation of reaction product A is a monohydroxyalkylcarboxylic acid. Suitable monohydroxyalkylcarboxylic acids are in particular glycolic acid, hydroxypivalic acid and malic acid. Also suitable are all other hydroxycarboxylic acids which have little tendency to form lactones.

The amount of components (d) and (e) together should be from 1 to 50, preferably from 2 to 40, equivalent %, based on component (a) and the equivalent ratio of component (d):component (e) should be from 1:9 to 9:1, preferably from 3:7 to 7:3.

Component B of the contact adhesive is from 2 to 90, preferably from 20 to 70, % by weight, based on the total amount of A and B, of monovinyl compound. Suitable monovinyl compounds are in particular those which, polymerized by themselves produce polymers having glass transition temperatures below 20° C. Examples thereof are vinyl esters, such as vinyl propionate, vinyl pivalate, vinyl butyrate and vinyl laurate, and also in particular acrylic and methacrylic esters of from 1 to 20 carbon atom alkanols, such as methyl acrylate, ethyl acrylate, n-butyl acrylate and methacrylate, isobutyl acrylate and methacrylate, and 2-ethylhexyl acrylate and methacrylate. Of particular interest for use as monovinyl compound B are the Versatic monoesters of 2,3-dihydroxyprop-1-yl acrylate and 1,3-dihydroxyprop-2-yl acrylate and mixtures thereof, which are readily obtainable by reacting glycidyl esters of Versatic acid with acrylic acid.

In the practice of producing the radiation-curable contact adhesive, component A can be prepared for example by first preparing an isocyanate-terminated oligourethane or polyurethane from components (a), (b) and (c) and then reacting the end groups with components (d) and (e).

However, component A can also be prepared by using as components (d) and (B) identical hydroxyalkyl (meth)acrylates, for example the said reaction products of glycidyl Versatates with acrylic acid. In this case, the complete reaction of the NCO groups is only obtained in the preparation of the radiation-curable mixture as such. The reaction temperatures for the polyurethane formation are in general in the range from 40° to 120° C., preferably from 60° to 90° C.

The radiation-curable contact adhesives, which consist essentially of components A and B, may additionally contain assistants in small amounts, for example polymerization stabilizers, such as hydroquinone, hydroquinone monomethyl ether, phenothiazine and di-tert-butyl-p-cresol, and also, in particular if curing by UV radiation is intended, photoinitiators, such as benzophenone, Michler's ketone, thioxanthone, benzoin ethers, benzil ketals or acylphosphine oxides. The radiation-curable contact adhesives according to the invention can be used for producing self-adherent coatings by coating sheetlike substrates and are suitable in particular for producing adhesive tapes, adhesive foils and self-adherent labels. Suitable base materials are for example films of polyethylene, polypropylene, polyethylene terephthalate and polyvinyl chloride and also paper, paperboard, textile materials and foam materials.

The base materials can be coated with the contact adhesives according to the invention in direct application, for example by knife coating, roller coating, casting or roll coating, or by means of nozzles. The contact adhesives can also be applied indirectly by the transfer method. The contact adhesive is applied in layer thicknesses from 5 to 500, in particular from 10 to 200, $\mu$m, corresponding to coating weights of from 5 to 500, in particular from 10 to 200, g/m$^2$. After application to the substrates the coats of contact adhesive can be irradiated with UV light or high-energy rays, in particular with electron beams of high energy. Suitable sources of irradiation are in particular electron beam generators, not only of the scanner type but also of the electrocurtain type. In the treatment with high-energy rays, the layer of contact adhesive is irradiated in general with an energy dose from usually 1 to 500 kGy (from 0.1 to 50 Mrad), preferably from 10 to 250 kGy (from 1 to 25 Mrad). The range from 15 to 150 kGy (from 1.5 to 15 Mrad) has proved particularly suitable. In the irradiative treatment, the accelerator voltage of the generator is in general from 150 to 300, preferably from 150 to 200, kV.

To assess the adhesive properties of the sheetlike structures coated with the contact adhesives according to the invention, polyester foils are coated in the Examples below in such a way that the coating has a thickness of of 25 $\mu$m (corresponding to an addon of 25 g/m$^2$). The coating applied to the base material is irradiated with electron beams in an electrocurtain unit. The coated and irradiated foils are each assessed using 2 cm wide test strips. Cohesion and tackiness are assessed by the shear test and the peel test respectively, as follows:

In the peel test, the test strips are adhesively bonded to a chromed plate and peeled off parallel to the adhesive layer, ie. at an angle of 180°, the peel force required being measured. The peel-off speed is 300 mm/min and the measurement is carried out 24 hours after the adhesive bond has been formed.

As a measure of the cohesion of the adhesive layer, the shear test is carried out by pressing the test strips onto a high gloss, chromed piece of metal 2.0×2.5 cm in area. The metal is suspended perpendicularly, and the end of the test strip is loaded with 1,000 g. The time taken until the adhesive bond breaks under the constant load of 1000 g is then determined. The measurement is carried out at 20° and at 50° C. The parts and percentages indicated in the Examples below are by weight, unless otherwise stated. The molecular weights indicated therein were calculated from the amount of monohydroxy compound used.

EXAMPLE 1

To a mixture of 490 parts of polytetramethylene oxide of molecular weight 2,000, 24 parts of 1,4-butanediol, 45 parts of a Versatic monoester mixture of 2,3-dihydroxyprop-1-yl acrylate and 1,3-dihydroxyprop-2-yl acrylate, 2 parts of di-tert-butyl-p-cresol and 0.7 part of dibutyltin dilaurate are added at 60° C., 160 parts of isophorone diisocyanate and the mixture is stirred for 6 hours. 15 parts of glycolic acid are then added, and stirring is continued until all the isocyanate groups have been consumed. The product obtained has a molecular weight of about 4 kg/mol and an acid number of 15 mg of KOH/g.

EXAMPLE 2

To a mixture of 507.4 parts of a polyesterol of adipic acid and a butanediol, pentanediol and hexanediol mixture of molecular weight 2,000, 6.1 parts of 1,4-butanediol, 15.8 parts of 1,4-butanediol monoacrylate, 2 parts of di-tert-butyl-p-cresol and 0.7 part of dibutyltin dilaurate, are added at 60° C., 116.6 parts of isophorone diisocyanate, and the mixture is stirred for 6 hours. 22.8 parts of hydroxypivalic are then added, and stirring is continued until all the isocyanate groups have been consumed. The product obtained has a molecular weight about 5 kg/mol and an acid number of 16 mg of KOH/g.

EXAMPLE 3

Example 2 is repeated, except that 400 parts of the polyesterol, 10.7 parts of 1,4-butanediol, 3.3 parts of 1,4-butanediol monoacrylate, 79.3 parts of isophorone diisocyanate and 2.4 parts of hydroxypivalic acid are used, affording under otherwise identical conditions a product having a molecular weight of about 30 kg/mol and an acid number of <1 mg of KOH/g.

EXAMPLE 4

To a mixture of 504.1 parts of a polyesterol of adipic acid and a mixture of equal parts of ethylene glycol and diethylene glycol of molecular weight 2,000, 6.2 parts of 1,4-butanediol, 15.8 parts of 1,4-butanediol monoacrylate, 2 parts of di-tert-butyl-p-cresol and 0.7 part of dibutyltin dilaurate are added at 60° C., 116.6 parts of isophorone diisocyanate, and the mixture is stirred for 6 hours. 25.8 parts of malic acid are then added, and stirring is continued until all the isocyanate groups have been consumed. The product obtained has a molecular weight of about 15 kg/mol and an acid number of 21 mg of KOH/g.

COMPARISONS (a) 11.9 parts of 2,2-dimethylolpropionic acid are uniformly dispersed with 150.5 parts of isophorone diisocyanate and, after the addition of 0.7 part of dibutyltin dilaurate, completely dissolved with stirring at 90° C. 490 parts of polytetramethylene oxide of molecular weight 2,000, 19 parts of hexanol and 11.9 parts of 1,4-butanediol are then added, and stirring is continued at 90° C. for a further 5 hours. 50 parts of the Versatic monoester mixture of 2,3-dihydroxyprop-1-yl acrylate and 1,3-dihydroxyprop-2-yl acrylate are then added, and stirring is continued at the same temperature until isocyanate is no longer detectable. The product obtained has a molecular weight of about 5 kg/mol and an acid number of 14 mg of KOH/g.

(b) To prepare a carboxyl-free polyurethane acrylate, Example 1 is repeated, except that 22 parts of 1,4-butanediol, 136 parts of isophorone diisocyanate and 52.5 parts of the Versatic monoester mixture of 2,3-dihydroxyprop-1-yl acrylate and 1,3-dihydroxyprop-2-yl acrylate are used (no hydroxyalkylcarboxylic acid was added), affording under otherwise identical conditions a product having a molecular weight of about 5 kg/mol and an acid number of <2 mg of KOH/g.

The products of Examples 1 to 4 and of Comparisons (a) and (b) are each dissolved in the same amount of a Versatic monoester mixture of 2,3-dihydroxyprop-1-yl acrylate and 1,3-dihydroxyprop-2-yl acrylate, and the contact adhesives obtained are applied in an amount of 25 g/m² to a polyester base foil. The coated foils are subjected to electron beam radiation of 35 kGy at an acceleration energy of 175 keV. The adhesive foils obtained show the following properties:

| Example | Peel strength in N/cm | Shear strength at 50° C. (hours/1,000 g/5 cm²) |
| --- | --- | --- |
| 1 | 4.2 | 3.3 |
| 2 | 4.8 | >96 |
| 3 | 2.9 | 68 |
| 4 | 4.8 | >96 |
| Comparisons | | |
| a | 1.5 | >96 |
| b | 0.8 | >96 |

We claim:
1. A radiation-curable contact adhesive, comprising:
(A) an oligomeric or polymeric reaction product having a molecular weight of from about 500 to 100,000 of:
 (a) a diisocyanate;
 (b) from 20–99 equivalent %, based on component (a), of a polyesterol or polyetherol or a combination thereof;
 (c) from 0–60 equivalent %, based on component (a), of a diol of 2 to 50 carbon atoms;
 (d) a hydroxyalkyl (meth)acrylate of 2 to 20 carbon atoms in the alkyl radical; and
 (e) a monohydroxyalkylcarboxylic acid having substantially no tendency to form a lactone; and
(B) from 2–90% by weight, based on the total amount of components A and B, of at least one monovinyl compound selected from the group consisting of monovinyl compounds which are capable of being self-polymerized to form a polymer having a glass transition temperature below about 20° C.;
and wherein the total amount of components (b), (c), (d) and (e) is equivalent in terms of OH groups to the amount of component (a), the amount of components (d) and (e) together is from 1 to 50 equivalent %, based on component (a), and the equivalent ratio of components (d):(e) is from about 1:9 to 9:1.

2. The radiation-curable contact adhesive as claimed in claim 1, comprising, based on components A and B, from 40 to 70% by weight of a reaction product A having a molecular weight from about 1,000 to 30,000; from 50 to 98 equivalent %, based on component (a), of component (b); from 0 to 40 equivalent %, based on component (a), of component (c); and from 2 to 40 equivalent %, based on component (a), of components (d) and (e); wherein the equivalent ratio of components (d):component (e) is from about 3:7 to 7:3, and wherein component (B) comprises an acrylic or methacrylic ester of an alkanol of 1 to 20 carbon atoms or a combination thereof.

3. The radiation-curable contact adhesive as claimed in claim 1, wherein said component (b) is a polyesterol.

4. The radiation-curable contact adhesive as claimed in claim 1, wherein said oligomeric or polymeric reaction mixture further comprises up to 5 equivalent % of triisocyanate, based on the total isocyanate (a).

5. The radiation-curable contact adhesive as claimed in claim 1, wherein said diol reactant (c) is an alkane diol having from 2 to 20 carbon atoms.

6. The radiation-curable contact adhesive as claimed in claim 1, wherein said diisocyanate is selected from the group consisting of isophorone diisocyanate, hexamethylene diisocyanate, 2,4- or 2,6-toluyene diisocyanate, 4,4'-diisocyanatodiphenyldimethane and 4,4'-diisocyanatodicyclohexylmethane.

7. The radiation-curable contact adhesive as claimed in claim 1, wherein said polyesterol is a polyesterol of adipic acid and ethylene glycol, 1,3-propanediol, 1,4-butanediol, 1,5-pentanediol, 1,6-hexanediol and neopentylglycol or mixtures thereof.

8. The radiation-curable contact adhesive as claimed in claim 1, wherein said polyether is selected from the group consisting of polytetramethylene oxide, polypropylene oxide, polyethylene oxide and copolymers of ethylene oxide and propylene oxide.

9. The radiation-curable contact adhesive as claimed in claim 1, wherein said diol is selected from the group consisting of 1,4-butanediol, 1,6-hexanediol, 1,3-propanediol, ethylene glycol, 1,8-octanediol and 1,10-decanediol.

10. The radiation-curable contact adhesive as claimed in claim 1, wherein said hydroxyalkyl(meth)acrylate is selected from the group consisting of β-hydroxylethylacrylate and methacrylate, 4-hydroxylbutylacrylate and methacrylate and the versatic monoester of 2,3-dihydroxy-prop-1-yl acrylate.

11. The radiation-curable contact adhesive as claimed in claim 1, wherein said monohydroxylalkylcarboxylic acid is selected from the group consisting of glycolic acid, hydroxy pivalic acid and maleic acid.

12. The radiation-curable contact adhesive as claimed in claim 1, wherein said monovinyl compound is acrylic acid or a vinyl ester selected from the group consisting of vinyl propionate, vinyl pivalate, vinyl butyrate, vinyl laurate, methacrylic esters of from 1 to 0 carbon atoms with alkanols, the versatic monoesters of 2,3-dihydroxyprop-1-yl acrylate and 1,3-dihydroxyprop-2-yl acrylate and mixtures thereof.

* * * * *